US012528927B2

(12) United States Patent
Sievers et al.

(10) Patent No.: US 12,528,927 B2
(45) Date of Patent: Jan. 20, 2026

(54) MECHANOCATALYTIC DEPOLYMERIZATION OF PLASTICS

(71) Applicant: Georgia Tech Research Corporation, Atlanta, GA (US)

(72) Inventors: Carsten Sievers, Atlanta, GA (US); Andrew W. Tricker, Sandy Springs, GA (US); Sankar Nair, Atlanta, GA (US); Christopher Jones, Atlanta, GA (US); Fani Boukouvala, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 714 days.

(21) Appl. No.: 17/801,027

(22) PCT Filed: Feb. 22, 2021

(86) PCT No.: PCT/US2021/019022
§ 371 (c)(1),
(2) Date: Aug. 19, 2022

(87) PCT Pub. No.: WO2021/168402
PCT Pub. Date: Aug. 26, 2021

(65) Prior Publication Data
US 2023/0107759 A1 Apr. 6, 2023

Related U.S. Application Data

(60) Provisional application No. 62/979,250, filed on Feb. 20, 2020.

(51) Int. Cl.
*C08J 11/16* (2006.01)
(52) U.S. Cl.
CPC ............ *C08J 11/16* (2013.01); *C08J 2367/02* (2013.01)

(58) Field of Classification Search
CPC .......... C08J 11/16; C08J 2367/02; C08J 11/24
See application file for complete search history.

(56) References Cited

U.S. PATENT DOCUMENTS

| 4,749,505 A | 6/1988 | Chung et al. |
| 2007/0219339 A1* | 9/2007 | Fregoso-Infante ...... C08J 11/24 528/271 |
| 2014/0250669 A1 | 9/2014 | Charkoudian et al. |

FOREIGN PATENT DOCUMENTS

| WO | 98/09997 A1 | 3/1998 |
| WO | 2017/007965 A1 | 1/2017 |

OTHER PUBLICATIONS

Schüth et al., Catalysis Today 234 (2014) 24-30.*
(Continued)

*Primary Examiner* — Vu A Nguyen
(74) *Attorney, Agent, or Firm* — TROUTMAN PEPPER LOCKE LLP; Ryan A. Schneider; Korbin M. Blunck

(57) ABSTRACT

Systems and methods for recycling polymers are provided. One embodiment provides a method for recycling synthetic polymers by combining the polymers with a solid depolymerizing catalyst in a vessel, mechanically shearing the combined polymers and the solid depolymerizing catalyst against each other to produce monomers from the polymers; and collecting the monomers. In some embodiments the solid depolymerizing catalyst is solid sodium hydroxide. In some embodiments collecting the monomers is achieved by contacting the sheared polymer and catalyst with a recyclable volatile solvent to dissolve the monomers. In some embodiments, the method includes purifying the collected monomers for repolymerization. In some embodiments purifying the monomers is achieved using nanofiltration membrane technology, cyclic fixed bed adsorption, simulated moving-bed adsorption or a combination thereof.

14 Claims, 3 Drawing Sheets

(56) References Cited

OTHER PUBLICATIONS

Hick et al., Green Chem., 2010, 12, 468-474.*
International Search Report and Written Opinion from Application No. PCT/US2021/19022 dated Jul. 7, 2021.
Wikipedia 'Nylon' Oct. 24, 2019 https://en.wikipedia.org/w/index.php?title=Nylon&oldid-922848547>.
Wikipedia 'Plastic' Jan. 21, 2020 https://en.wikipedia.org/w/index.php?title=Plastic&oldid=936865592>.

* cited by examiner

MECHANOCATALYTIC DEPOLYMERIZATION OF PLASTICS

CROSS-REFERENCE TO RELATED APPLICATIONS

This application claims benefit of and priority to U.S. Patent Application No. 62/979,250 filed on Feb. 20, 2020, which is incorporated by reference in its entirety.

TECHNICAL FIELD OF THE INVENTION

Aspects of the invention are directed to the recycling of polymers such as poly(ethylene terephthalate)

BACKGROUND OF THE INVENTION

Chemical recycling of poly(ethylene terephthalate) (PET) has gained increasing attention in context of environmental impacts and the circular economy. Monomeric or oligomeric products of PET can conventionally be obtained by hydrolysis, alcoholysis, and glycolysis, using homogeneous acids ($H_2SO_4$, $HNO_3$), bases (NaOH), or soluble metal acetates. However, significant challenges exist in the economics of such processes, both in depolymerization as well as separations costs. Rather than pursue incremental improvements in the economics of conventional processes, a significant paradigm change is necessary.

In industrial processes, heterogeneous (i.e., solid) catalysts are generally preferred because they can be easily separated from products and residual reactants. However, during solid feedstock conversion, it is challenging to provide sufficient catalyst-feed contact. Mechanocatalytic depolymerization (using ball mills) is an unconventional approach to process solid feedstocks with a solid catalyst in an economically viable way that does not require solvents. While there are gaps in the fundamental understanding of mechanochemistry, mechanocatalytic depolymerization has been demonstrated on a lab scale for lignocellulosic biomass, cellulose, lignin, and chitin. In addition to the attractiveness of chemical depolymerizing plastics essentially in the solid phase, ball milling is a highly scalable industrial process, and its many applications include the production of several billion tons/year of cement (FIG. 1A). Ball mills operate with electrical energy, and are thus also compatible with the increasing availability of electricity from renewable sources. Mechanocatalysis thus has many advantages over other unconventional approaches such as biological depolymerization by microbes/enzymes, which must overcome large challenges in productivity, resistance to contaminants, and separations especially when handling mixed-waste feedstocks.

In catalytic ball milling, mechanical forces are used to shear reactants and catalysts against each other, creating an intimate contact as well as providing energy required for reactions. Recent work demonstrated mechanochemical depolymerization of lignin (FIG. 1B), resulting in mostly monomeric and dimeric products using solid NaOH as a base catalyst and a few drops of methanol as a stabilizer for reactive intermediates. Chemical reactions are accelerated as explained by various mechanisms, e.g., generation of "hot spots", formation of highly active catalytic sites, and triboelectric effects. For example, recent experimental and modeling studies show that transient "hot spots" (>1100° K) are generated when $CaCO_3$ is milled with steel balls to form CaO and $CO_2$. Schath and co-workers demonstrated that milling with $Cr_2O_3$ catalysts created highly active sites for CO oxidation to $CO_2$ (Rashidi, F., et al., *ACS Sustainable Chemistry & Engineering* 5:1002-1009 (2016)). The effects of different mechanisms can vary depending on the specific process of interest.

Polymer recycling also requires processing steps for product separation and reactant/feedstock recycle. Greater complexity is created in mixed feedstocks, e.g., PET containing smaller amounts of poly(amide)s (nylon), cellulosics (cotton/rayon), or PVC. This results in complex multicomponent products that contain monomers, partially depolymerized species, and well as unreacted colloidal species resulting from the non-PET components. So far, PET recycling processes have used conventional, energy and capital-intensive separation processes (including distillation), which have a negative technoeconomic impact.

Economical separation of complex multicomponent liquid streams in harsh environments has recently been addressed through the development of robust membranes and adsorbents. A robust graphene oxide (GO) membrane technology economically fractionate complex and corrosive kraft black liquor streams from wood pre-treatment—a highlight being the validation of the technology over 1,500 hours of continuous operation in real black liquor feeds has recently been described. High-performance continuous adsorption processes are also being developed to separate renewable aromatic (furanic) monomers from multicomponent reaction mixtures. Additionally, process systems engineering is necessary to explore and identify the most viable combination of units and optimize the technoeconomic viability. Such an approach involves modeling of unit operations (i.e., reactor, separations and auxiliary units), identification of degrees of freedom of each process step and the connections between units; and integration of models to form a process superstructure that includes all possible alternative process configurations (e.g., separation before and/or after reaction, recycle streams, etc). Once this superstructure is available, technoeconomic analysis coupled with mathematical programming could be used to identify optimal operation and new designs even in the presence of uncertainty.

Thus, there is a need for new systems and methods for recycling polymers.

SUMMARY OF THE INVENTION

Systems and methods for recycling polymers are provided. One embodiment provides a method for recycling synthetic polymers by combining the polymers with a solid depolymerizing catalyst in a vessel, mechanically shearing the combined polymers and the solid depolymerizing catalyst against each other to produce monomers from the polymers; and collecting the monomers. In some embodiments the solid depolymerizing catalyst is solid sodium hydroxide. In some embodiments collecting the monomers is achieved by contacting the sheared polymer and catalyst with a recyclable volatile solvent to dissolve the monomers. In some embodiments, the method includes purifying the collected monomers for repolymerization. In some embodiments purifying the monomers is achieved using nanofiltration membrane technology, cyclic fixed bed adsorption, simulated moving-bed adsorption or a combination thereof. Mechanically shearing the combined polymers and the solid depolymerizing catalyst against each other to produce monomers from the polymers comprises milling the combined polymers and the solid depolymerizing catalyst with a grinding ball.

Another embodiment provides a method for mechanochemically recycling synthetic polymer products by milling the synthetic polymer products and solid depolymerizing catalyst in a milling vessel with a grinding ball, wherein the synthetic polymer products are depolymerized into monomers, introducing vaporized water and alcohol into the milling vessel to produce a slurry, recovering the catalyst and unreacted or partially reacted synthetic polymer products from the slurry, wherein the catalyst and unreacted or partially reacted synthetic polymer products can be used again in another cycle of recycling, separating synthetic polymer product monomers and non-polymer monomers from the slurry, and purifying the synthetic polymer product monomers and non-polymer monomers, wherein the purified monomers are used as products or byproducts to produce new synthetic polymer products. In some embodiments the synthetic polymer products include polyethylene terephthalate (PET). In some embodiments the solid depolymerizing catalyst includes solid depolymerizing catalyst particles that can be recovered magnetically. For example, the solid depolymerizing catalyst can include surface-functionalized iron oxide nanoparticles. In some embodiments the separating of the synthetic polymer product monomers and non-polymer monomers from the slurry includes contacting the slurry with a recyclable volatile solvent to dissolve the monomers. In some embodiments recovering the catalyst and unreacted or partially reacted synthetic polymer products from the slurry includes nanofiltration membrane technology to recycle high molecular weight catalysts and unreacted or partially reacted synthetic polymer products. For example, the nanofiltration membrane technology can be selected from the group consisting of graphene oxide nanofiltration, polyethersulfone nanofiltration, and § fluoride nanofiltration. In some embodiments, separating synthetic polymer product monomers and non-polymer monomers from the slurry includes evaporative crystallization to concentrate the slurry, recover volatile solvent, and crystallize monomers, wherein different monomers crystallize at different concentrations and temperatures. In some embodiments, separating the synthetic polymer product monomers and non-polymer monomers from the slurry includes cyclic fixed bed adsorption or simulated moving-bed adsorption.

Another embodiment provides a method for depolymerizing synthetic polymers, by milling a synthetic polymer and a catalyst in a milling vessel with a grinding ball, wherein the synthetic polymers are depolymerized into monomers, recovering the solid fraction, introducing the solid fraction into water, wherein the catalyst and soluble monomer products are dissolved into the water producing a liquid comprising dissolved catalyst and soluble monomer products, and precipitating the soluble monomer products from the liquid. In some embodiments, the milling step further includes methanol as a stabilizer for reaction intermediates. In some embodiments include purifying the soluble monomer products for use in synthetic polymer products.

Another embodiment provides a system for recycling synthetic polymers, including a mechanochemical reactor; a mixing tank downstream of and in liquid communication with the mechanochemical reactor; a nanofiltration system downstream of and in liquid communication with the mixing tank, solvent dryers in liquid communication with both the mixing tank and the nanofiltration system, and optionally in liquid communication with the mechanochemical reactor, a crystallizer, chromatography column, or both downstream of and in liquid communication with the nanofiltration system; and a distillation unit downstream of and in liquid communication with the crystallizer, chromatography column, or both. In some embodiments the mechonochemical reactor is a ball mill or a hammer mill, the crystallizer is an evaporative crystallizer, and chromatography column is fixed bed or moving bed. In some embodiments the liquid communication between the system components is one directional.

Another embodiment provides a method for recycling synthetic polymers from solid mixed textile waste, by: combining a solid mixed textile waste feedstock with a solid depolymerizing catalyst in a vessel, mechanically shearing the combined solid mixed textile waste feedstock and the solid depolymerizing catalyst against each other to produce monomers from polymers present in the solid mixed waste feedstock, collecting the monomers, purifying the monomers; and repolymerizing the monomer into synthetic polymers for repurposing. In some embodiments the solid mixed textile waste feedstock include polyethylene terephthalate (PET). In some embodiments the monomers include bishydroxyethylene terephthalate, dimethyl terephthalate, and terephthalic acid. In some embodiments the solid mixed textile waste feedstock includes one or more nylons. In some embodiments the monomers include adipic acid, sebacic acid, dodecanedoic acid, terphthalic acid, isophtalic acid, tetramethylene diamine, hexamethylene diamine, 1,9-diaminononane, 2-methyl pentamethylene diamine, trimethyl hexamethylene diamine, m-xylylene diamine, and 1,5-pentanediamine. In some embodiments the solid depolymerizing catalyst is sodium hydroxide.

DETAILED DESCRIPTION OF THE INVENTION

One embodiment provides a continuous process combining a mechanocatalytic reactor with separation processes based mainly upon membranes and crystallization is provided. The objectives will have a significant concurrency due to the integral approach pursued. The "base case" process flowsheet (FIG. 2), defines a "superstructure" of process integration alternatives, refine the "best" alternative via technoeconomic metrics and optimization.

Figure 1A:
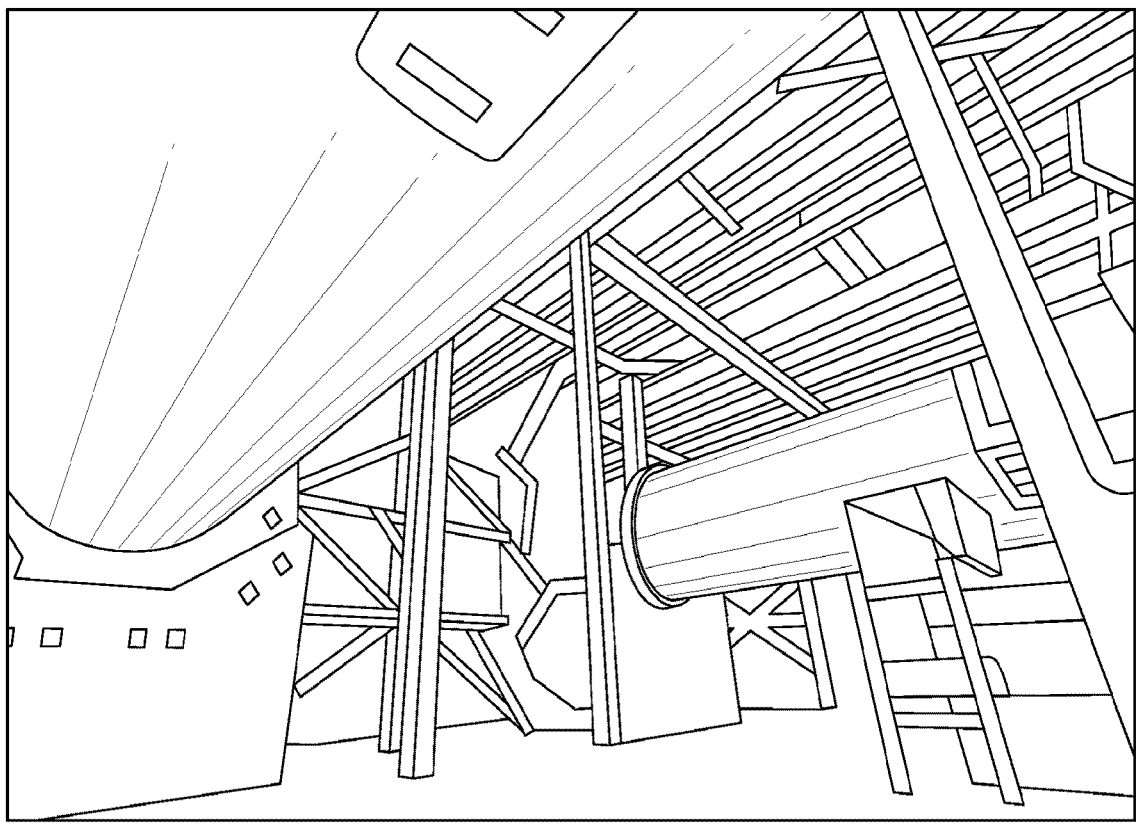
FIG. 1A is a photograph of an industrial ball mill for cement production.
Figure 1B:
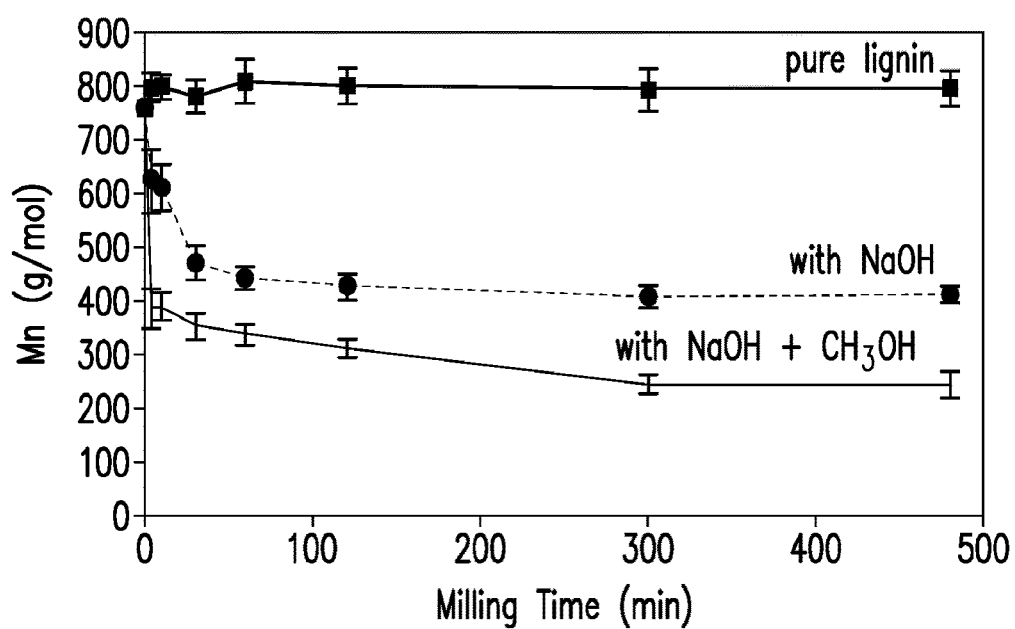
FIG. 1B is a line graph for mechanocatalytic lignin depolymeration.
Figure 1C:
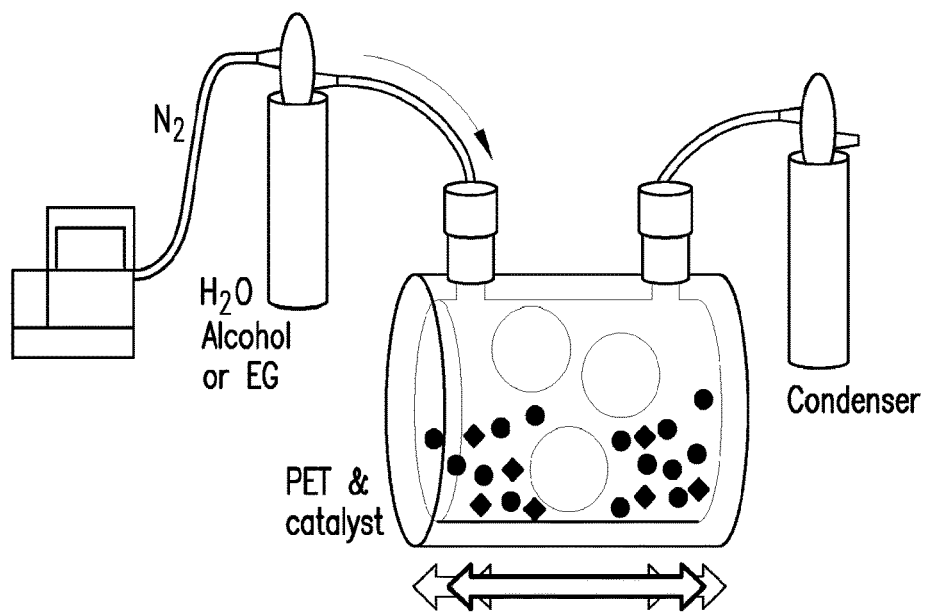
FIG. 1C is an exemplary lab-scale mill system.

In some embodiments a mechanocatalytic process can be used to depolymerize PET into monomers. For this purpose, PET will be processed in shaker ball mill (FIG. 1C) with solid acid catalysts (e.g., iron oxide nanoparticles' or surface-functionalized iron oxide nanoparticles which can be recovered magnetically) and milling balls made from stainless steel or other hard materials. There is one previous report using iron oxide nanoparticles to depolymerize PET, but in the absence of mechanical forces (Bartolome, L., et al., *Green Chemistry*, 16, 279-286 (2014)). Co-reactants (water/alcohols/ethylene glycol) can be provided as vapors in a carrier gas stream, because excessive liquid would buffer the mechanical impact of collisions. Due to the high melting points of the monomers (DMT: 141° C., BHET: 106° C., PTA: 427° C.), depolymerization will result in catalyst particles coated with mostly solid products. Other monomers such as ethylene glycol (from PET) and hexamethylenediamine (from nylon) would likely be in liquid form, so that the product can be generally assumed to be a concentrated slurry. This "solid"/"slurry" phase depolymerization with minimal liquid products is attractive for scalability, since it creates a strong potential of directly using existing continuous ball mill technology. The process can will be performed in batch mode in a shaker ball mill, but other types of mills would be used for eventual scale-up and continuous operation. The compositions of liquid or soluble reaction products will be quantified by NMR spectroscopy or chromatography (GC/HPLC). Targeting nanoparticles can be used with the addition of different types and concentrations of Bronsted and/or Lewis acid sites by design.

Figure 2:
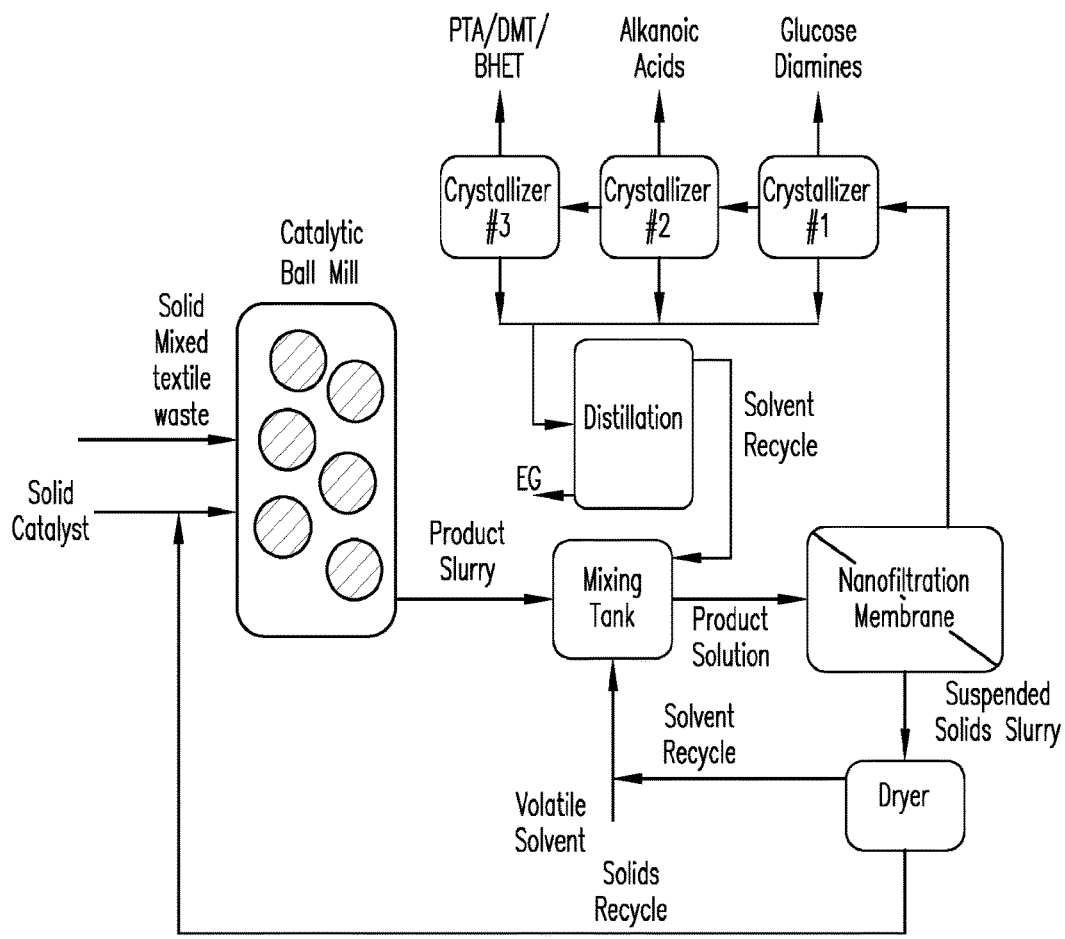
FIG. 2 shows an exemplary base case continuous process flowsheet for mixed-waste PET recycling by mechnocatalyic depolymerization and product separations.

In one embodiment the following classes of components can be present in the product mixture: (1) catalysts, (2) unreacted/partially reacted feedstock, (3) PET monomers, and (4) non-PET monomers (amines, adipic/other alkanoic dicarboxylic acids, glucose). Additionally, an easily recyclable (volatile) green solvent (e.g., ethanol, ethyl acetate) can be added in minimum required quantity to the product slurry after it exits the ball mill, to dissolve the monomers and enable separations processes (FIG. 2). As shown, classes (1) and (2) would be recovered and recycled to the reactor, and classes (3) and (4) would be purified as desired products/byproducts. The added solvent would be recovered and recycled. A robust graphene oxide (GO) nanofiltration membrane technology can be used to recycle high-molecular weight classes (1) and (2), with a dryer included for residual solvent removal. These GO membranes are stable in extreme chemical environments, with molecular weight cutoffs (MWCOs) tunable from about 1000 Da to about 100 Da, and much lower fouling than polymeric membranes. They were originally developed for fractionating kraft black liquor, which is a high-solids byproduct of biomass depolymerization and contains a similar species distribution (polymers, oligomers, monomers). In some embodiments, magnetic stirrers can be used. Next, the clarified permeate stream from the membrane is separated by evaporative crystallizers to concentrate the solution, recover additional volatile solvent, and crystallize the dicarboxylic acids (terephthalic from PET, and alkanoic from nylon) and diamines (from nylon) at different operating concentrations/temperatures. Since the crystallizers are operating with a volatile organic solvent (low heat of vaporization), energy consumption is expected to be much lower than for monomer crystallizations from aqueous solvents in biological depolymerizations. The crystallization processes can be demonstrated using simple rotary evaporators (rotovaps). The stream exiting the final crystallization step will contain ethylene glycol and volatile solvent, which will be separated by a final distillation step. Again, this is expected to have a low cost due to the large volatility difference between the two components. In one embodiment, an alternative to crystallizers is to use adsorption processes—either cyclic fixed bed or continuous simulated moving bed (SMB)—for recovering monomers.

Two major challenges towards the development of an integrated process flowsheet are: (1) a systems-level analysis of critical decisions and linking variables across process units and (2) integration of different fidelity models using a combination of physics-based and data-driven reduced-order models. This work involves close collaboration between the modeling and experimental groups. All the experimental data and known physics-based models of reactors and separators can be combined and translated into a series of integrated base-case process flowsheets. The model detail can be sufficient to capture the limits of each unit, but maintain tractability of the systems-level process synthesis optimization problem. For example, the final distillation step is easily modeled through established mass-balance and equilibrium equations, whereas the mechanocatalytic reactor model will consist of data-driven correlations/kinetic models developed using the obtained data. This hybrid physics-based and data-driven approach" can accelerate process development even without "full fundamental knowledge" of each process unit.

Figure 3:
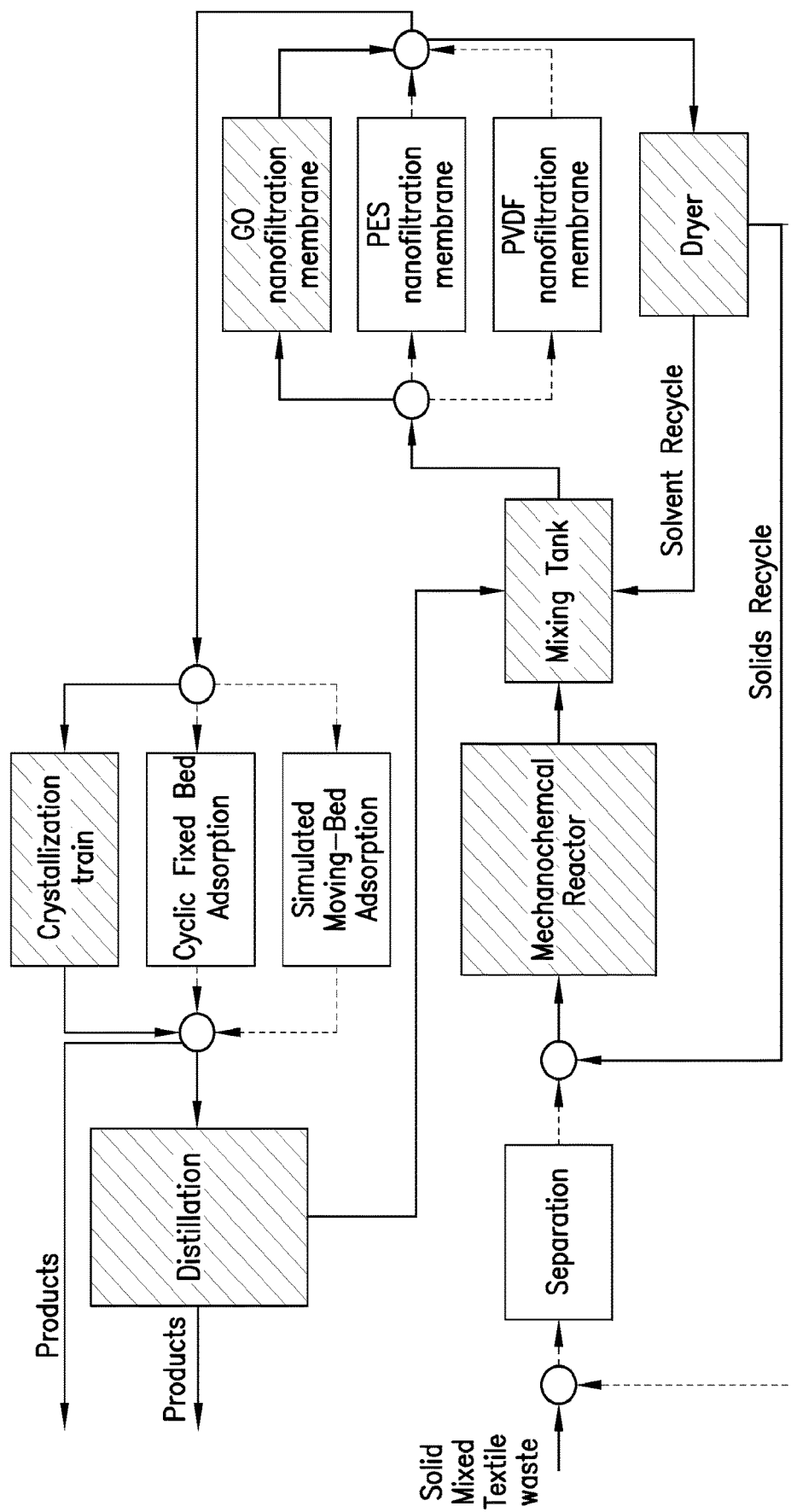
FIG. 3 shows a representative flowsheet superstructure including potential alternative steps.

FIG. 3 describes still another embodiment that includes all process alternatives and potential stream connections (i.e., a combination of all of possible base-case flowsheets). This model, coupled with Mixed-Integer Nonlinear Programming (i.e., the introduction of yes/no decision variables that select/deactivate a process step) can be used to identify the optimal process alternative for typical compositions of solid plastic feedstocks and different objectives and constraints. This framework can be used to answer important questions, e.g., (a) Which process configuration is most robust to feed variations while satisfying product specifications; (b) Is a different optimal process configuration favored when an economic/cost objective versus an energy efficiency objective is enforced.

While in the foregoing specification this invention has been described in relation to certain embodiments thereof, and many details have been put forth for the purpose of illustration, it will be apparent to those skilled in the art that the invention is susceptible to additional embodiments and that certain of the details described herein can be varied considerably without departing from the basic principles of the invention.

All references cited herein are incorporated by reference in their entirety. The present invention may be embodied in other specific forms without departing from the spirit or essential attributes thereof and, accordingly, reference should be made to the appended claims, rather than to the foregoing specification, as indicating the scope of the invention.

We claim:

1. A method comprising:
    combining polymer products with a depolymerizing catalyst to produce depolymerized polymers;
    mechanically shearing the combined polymer products and the depolymerizing catalyst against each other to produce monomers;
    collecting the monomers;
    purifying the collected monomers for repolymerization; and
    producing a slurry from the monomers, water and alcohol;
    wherein purifying is selected from the group consisting of purifying via nanofiltration membrane technology, cyclic fixed bed adsorption, simulated moving-bed adsorption and a combination thereof.

2. The method of claim 1, wherein collecting the monomers comprises contacting the sheared combined polymer products and the depolymerizing catalyst with a recyclable volatile solvent.

3. The method of claim 1, wherein mechanically shearing comprises milling the combined polymer products and the depolymerizing catalyst with a grinding ball.

4. A method comprising:
    milling polymer products and a depolymerizing catalyst in a milling vessel with a grinding ball to produce depolymerized polymers; and
    producing a slurry from the depolymerized polymers, water and alcohol;
    wherein:

the polymer products are synthetic polymer products that are depolymerized into monomers; and producing comprises introducing vaporized water and the alcohol into the milling vessel to produce the slurry.

5. The method of claim 4, wherein the synthetic polymer products comprise polyethylene terephthalate (PET).

6. The method of claim 4, wherein the depolymerizing catalyst comprises solid depolymerizing catalyst particles that can be recovered magnetically.

7. The method of claim 4, wherein the depolymerizing catalyst comprises surface-functionalized iron oxide nanoparticles.

8. The method of claim 4 further comprising separating synthetic polymer product monomers and non-polymer monomers from the slurry.

9. The method of claim 4 further comprising recovering the depolymerizing catalyst and unreacted or partially reacted synthetic polymer products from the slurry.

10. The method of claim 9, wherein recovering comprises nanofiltration membrane technology to recycle high molecular weight catalyst and unreacted or partially reacted synthetic polymer products; and wherein the nanofiltration membrane technology is selected from the group consisting of graphene oxide nanofiltration, polyethersulfone nanofiltration, and polyvinylidene fluoride nanofiltration.

11. The method of claim 8, wherein separating comprises at least one of:

contacting the slurry with a recyclable volatile solvent to dissolve the monomers;

evaporative crystallization to concentrate the slurry, recover volatile solvent, and crystallize monomers, wherein different monomers crystallize at different concentrations and temperatures;

cyclic fixed bed adsorption; and simulated moving-bed adsorption.

12. The method of claim 4, wherein:

the synthetic polymer products comprise solid mixed textile waste feedstock;

the depolymerizing catalyst is a solid depolymerizing catalyst;

the method further comprises:

mechanically shearing the combined solid mixed textile waste feedstock and the solid depolymerizing catalyst against each other to produce monomers from polymers present in the solid mixed waste feedstock;

collecting at least a portion of the monomers;

purifying at least a portion of the collected monomers; and repolymerizing at least a portion of the purified monomers into synthetic polymers for repurposing; and the monomers are selected from the group consisting of adipic acid, sebacic acid, dodecanedoic acid, terphthalic acid, isophtalic acid, tetramethylene diamine, hexamethylene diamine, 1,9-diaminononane, 2-methyl pentamethylene diamine, trimethyl hexamethylene diamine, m-xylylene diamine, and 1,5-pentanediamine.

13. A method comprising:

milling polymer products with a solid depolymerizing catalyst to produce depolymerized polymers, wherein at least a portion of the polymer products are depolymerized into monomers;

producing a slurry from the depolymerized polymers, water and alcohol;

recovering at least a portion of the solid depolymerizing catalyst and unreacted or partially reacted polymer products from the slurry;

separating at least a portion of the polymer product monomers and non-polymer monomers from the slurry;

purifying at least a portion of the polymer product monomers and non-polymer monomers;

wherein:

milling comprises milling in a milling vessel; and producing the slurry comprises introducing the water being vaporized water and the alcohol to the milling vessel.

14. The method of claim 13, wherein:

at least a portion of the recovered solid depolymerizing catalyst is configured to be used again in another cycle of recycling;

at least a portion of the unreacted or partially reacted polymer products are configured to be used again in another cycle of recycling; and/or at least a portion of the purified polymer product monomers are configured to be used as products or by-products to produce new polymer products.

\* \* \* \* \*